United States Patent [19]

Maitland

[11] Patent Number: 4,761,792
[45] Date of Patent: Aug. 2, 1988

[54] LASER APPARATUS

[75] Inventor: Arthur Maitland, Fife, Scotland

[73] Assignee: English Electric Valve Company, Chelmsford, England

[21] Appl. No.: 898,555

[22] Filed: Aug. 21, 1986

[30] Foreign Application Priority Data

Aug. 22, 1985 [GB] United Kingdom ............... 8521067

[51] Int. Cl.$^4$ ............................................. H01S 3/03
[52] U.S. Cl. ................................... 372/56; 372/33; 372/61
[58] Field of Search ............................. 372/56, 61, 33

[56] References Cited

U.S. PATENT DOCUMENTS

| 4,187,474 | 2/1980 | Hug et al. | 372/56 |
| 4,701,925 | 10/1987 | Fuke et al. | 372/56 |
| 4,710,938 | 12/1987 | Fuke et al. | 372/61 |

FOREIGN PATENT DOCUMENTS

| 390127 | of 1931 | United Kingdom . |
| 475183 | of 1936 | United Kingdom . |
| 455923 | of 1936 | United Kingdom . |
| 519854 | 4/1940 | United Kingdom . |
| 529685 | 11/1940 | United Kingdom . |
| 653421 | 5/1951 | United Kingdom . |
| 751229 | 6/1956 | United Kingdom . |
| 1582525 | 1/1981 | United Kingdom . |

Primary Examiner—James W. Davie
Assistant Examiner—Xuan T. Vo
Attorney, Agent, or Firm—Spencer & Frank

[57] ABSTRACT

Laser apparatus comprising a discharge vessel of thermally insulating material and a protective metal layer disposed on the inner surface of the discharge vessel. During operation of the laser apparatus, copper powder is vaporised to form at least part of the laser active medium. Because of the protective metal layer the discharge vessel wall is prevented from damage due to its contents.

9 Claims, 1 Drawing Sheet

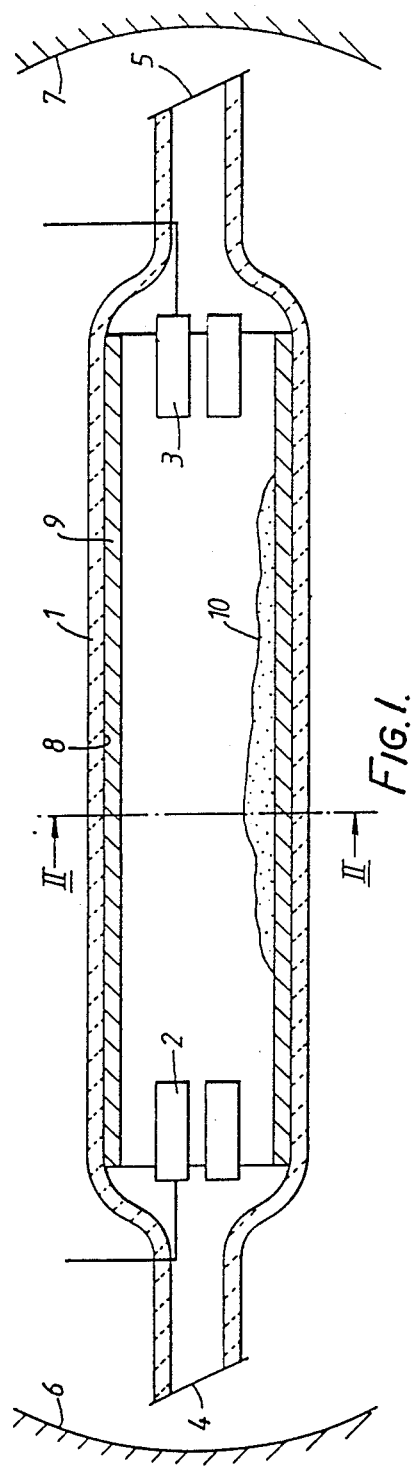
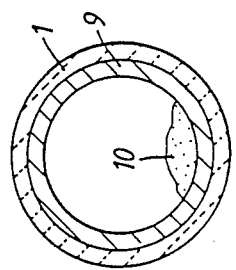

LASER APPARATUS

BACKGROUND OF THE INVENTION

This invention relates to laser apparatus.

For some time a source of concern during the life of certain lasers has been a tendency for the interior surface of the laser vessel to deteriorate during service and for cracking of the envelope to occur.

One object of the present invention seeks to provide improved laser apparatus, in which the above problems are mitigated.

SUMMARY OF THE INVENTION

According to this invention, there is provided laser apparatus comprising a discharge vessel of thermally insulating material arranged to contain a metal vapour laser active medium during operation, and a protective metal layer disposed within the discharge vessel such that a surface of the discharge vessel wall is isolated from the contents of the discharge vessel thereby protecting the surface from damage by the contents. The metal vapour may be, for example, copper, gold or strontium. The invention stems from the recognition that the cracking referred to above appears to be due to differential expansion of the discharge vessel. Investigations suggested that this might be due to thermal gradients established because of sputtering of metal components within the discharge vessel and their non-uniform condensation upon the inner wall of the vessel. Whether this is so or not, the provision of a protective metal layer as described above appears to mitigate the problem. In addition, the protective metal layer tends to prevent pitting of the interior surface of the vessel by the corrosive effect of metal and other components in the filling.

The protective metal layer may be such that it is unaffected by the contents of the discharge vessel, but a material may be used which is gradually damaged over a period of time by the contents and which is arranged to be readily removable and easily replaced. Preferably, the protective metal layer is disposed on the said surface, although it could be spaced from the surface. It is also preferred that the surface is substantially all the surface of the discharge vessel which would otherwise be exposed to the contents.

Preferably, the protective metal layer is in the form of a hollow cylinder. This may be formed prior to the apparatus being assembled, or may be produced by spraying or otherwise laying down the protective metal layer on the discharge vessel surface.

Any heating of the protective metal layer caused by deposition of the contents on its surface is uniformly conducted over its surface area and thus across the surface of the discharge vessel which is isolated by it.

BRIEF DESCRIPTION OF DRAWING

The invention is now further described by way of example with reference to the accompanying drawing, in which:

FIG. 1 is a schematic longitudinal section of apparatus in accordance with the invention; and FIG. 2 is a tranverse section taken along the line II—II on FIG. 1.

DESCRIPTION OF A PREFERRED EMBODIMENT

With reference to FIGS. 1 and 2, the laser apparatus includes a cylindrical ceramic discharge vessel 1 having a cathode 2 at one end and an anode 3 at its other end. The discharge vessel 1 incoporates Brewster windows 4 and 5 located on its longitudinal axis for permitting the laser radiation produced during operation of the laser apparatus to leave the discharge vessel 1. Two mirrors 6 and 7 are located outside the discharge vessel 1 and are arranged to reflect radiation from the discharge vessel 1 back into the discharge vessel 1. One of the mirrors 6 is partially transmissive to permit laser radiation to exit from the apparatus.

An inner surface 8 of the discharge vessel 1, is coated with a protective layer 9 of a refractory metal for example, molybdenum or tantalum, or some other refractory material. The protective metal layer 9 is formed as a hollow cylinder prior to assembly of the laser apparatus, is inserted within the discharge vessel 1 during assembly and is removable from the discharge vessel. Copper powder 10 is disposed along the length of the discharge vessel 1.

During operation of the laser apparatus, a discharge is established within the discharge vessel 1, thus heating the copper powder 10 and causing copper vapour to be given off to form part of the laser active medium. Since the surface 8 of the discharge vessel 1 is isolated from the copper vapour by the protective metal layer 9, its surface is protected from damage by molten copper and the copper vapour and other contents of the discharge vessel 1. Thus damage to the inner surface of the discharge vessel 1 is reduced. Thermal energy generated within the discharge vessel 1 and heating effects due to molten metal are distributed substantially uniformally over the surface of the protective metal layer 9, and hence the surface 8 of the discharge vessel 1.

Although in the above embodiment of the invention a continuous tube 9 is included, the protective metal layer could be in the form of cylindrical segments or some other convenient configuration.

I claim:

1. A laser apparatus comprising:
   a discharge vessel having an inner surface and first and second spaced-apart ends, said discharge vessel being made of a thermally insulating material susceptible to being damaged by a metal vapor laser active medium;
   first and second electrodes located within said discharge vessel at said first and second ends;
   means adjacent the ends of said discharge vessel for forming with said discharge vessel a resonant cavity;
   material contained within said discharge vessel, said material acting as a metal vapor laser active medium during operation of said laser apparatus; and
   a protective metal layer interposed between the inner surface of said discharge vessel and said material thereby isolating the inner surface of said discharge vessel from said material and protecting said surface from damage.

2. Apparatus as claimed in claim 1 wherein said protective metal layer is disposed on the inner surface of said discharge vessel.

3. Apparatus as claimed in claim 1 and wherein said protective metal layer is removable from said discharge vessel.

4. Apparatus as claimed in claim 1 and wherein said inner surface is substantially all of the surface of said discharge vessel which would otherwise be exposed to said contents.

5. Apparatus as claimed in claim 1 and wherein said protective metal layer is in the form of a hollow cylinder.

6. Apparatus as claimed in claim 1 wherein the thermally insulating material of which said discharge vessel is made is a ceramic.

7. Apparatus as claimed in claim 1 wherein said protective metal layer is made of a refractory metal.

8. Apparatus as claimed in claim 7 wherein said refractory metals are selected from the group consisting of molybdenum and tantalum.

9. Apparatus as claimed in claim 1 wherein said material is copper powder.

* * * * *